(12) United States Patent
Iwahori et al.

(10) Patent No.: US 8,212,506 B2
(45) Date of Patent: Jul. 3, 2012

(54) AC MOTOR DRIVING CIRCUIT AND ELECTRIC CAR DRIVING CIRCUIT

(75) Inventors: Michio Iwahori, Tokyo (JP); Masakazu Gekinozu, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 347 days.

(21) Appl. No.: 12/588,889

(22) Filed: Oct. 30, 2009

(65) Prior Publication Data

US 2010/0109585 A1    May 6, 2010

(30) Foreign Application Priority Data

Oct. 30, 2008  (JP) ................................ 2008-280067

(51) Int. Cl.
*H02P 27/00*  (2006.01)
(52) U.S. Cl. .............. 318/400.3; 318/800; 318/801; 318/148; 318/139
(58) Field of Classification Search .......... 318/400.3, 318/800, 801, 148, 139
See application file for complete search history.

(56) References Cited

U.S. PATENT DOCUMENTS

| | | | | |
|---|---|---|---|---|
| 4,039,914 | A | * | 8/1977 | Steigerwald et al. ......... 318/375 |
| 5,642,270 | A | * | 6/1997 | Green et al. .................. 363/17 |
| 5,808,882 | A | * | 9/1998 | Mochikawa ................... 363/46 |
| 5,905,642 | A | * | 5/1999 | Hammond ...................... 363/37 |
| 2005/0162023 | A1 | | 7/2005 | Habu |
| 2007/0274109 | A1 | | 11/2007 | Oyobe et al. |

FOREIGN PATENT DOCUMENTS

| | | |
|---|---|---|
| JP | 04-088884 A | 3/1992 |
| JP | 09-233856 A | 9/1997 |
| JP | 2004-112883 A | 4/2004 |
| JP | 2004-222337 A | 8/2004 |
| JP | 2005-318731 A | 11/2005 |

* cited by examiner

*Primary Examiner* — Walter Benson
*Assistant Examiner* — David Luo
(74) *Attorney, Agent, or Firm* — Rabin & Berdo, P.C.

(57) ABSTRACT

In an AC motor driving circuit, a current-type rectifier circuit having a filter circuit and first bidirectional switches bridge-connected to the filter circuit is provided in an output of an AC power supply. An AC motor is connected to an output of the rectifier circuit through a voltage-type inverter. One terminal of each of second bidirectional switches is connected to corresponding one of output terminals of the current-type rectifier circuit. The other terminals of the second bidirectional switches are collectively connected to one terminal of a series circuit having a DC power supply and a reactor. The other terminal of the series circuit is connected to one output terminal of the current-type rectifier circuit. With this configuration, a large capacitor for a DC link can be dispensed with, so that a reduction in circuit size and weight can be attained.

16 Claims, 11 Drawing Sheets

AC MOTOR DRIVING CIRCUIT AND ELECTRIC CAR DRIVING CIRCUIT

This application claims priority from Japanese patent application serial number 2008-280067, filed on Oct. 30, 2008, hereby incorporated by reference herein.

BACKGROUND OF THE INVENTION

1. Field of the Invention

The present invention relates to an AC motor driving circuit which uses an AC power supply as an input and drives an AC motor by using a DC power supply including a storage battery or a capacitor, and an electric car driving circuit using the driving circuit.

2. Description of the Related Art

For an AC motor driving circuit of this kind, there is previously known a circuit as shown in FIG. 12 (e.g. see JP-A-2004-112883).

FIG. 12 is a circuit diagram showing a first example of the prior art. In FIG. 12, a three-phase output of an AC motor M2 is converted into DC power by a voltage-type rectifier circuit 31 and the DC power is smoothed by a capacitor 13. The voltage-type rectifier circuit 31 has bridge-connected arms. Each of the arms has a switching element, and a diode back-to-back connected to the switching element. A DC chopper circuit 12, formed of a reactor L1 and switching devices Q1 and Q2 paired with their respective corresponding diodes D1 and D2, is provided between the smoothed DC power (between junctions N1 and N2) and a battery B so that electric power can be exchanged between the smoothed DC power and the battery B. Moreover, an AC motor M1 is driven by a voltage-type inverter 14 using the DC power. The voltage-type inverter 14 has bridge-connected arms each of which has a switching element (Q3 to Q8), and a diode (D3 to D8) back-to-back connected to the switching element. A control apparatus 30 controls the AC motor driving circuit based on torque command values (TR1 and TR2) and number of motor rotations (MRN1 and MRN2).

On the other hand, a circuit shown in FIG. 13 has been known as an example in which an output of an AC motor generator is directly converted into AC power by a matrix converter and the AC power is fed to an AC motor (e.g. see JP-A-2005-318731).

FIG. 13 is a circuit diagram showing a second example of the prior art. In FIG. 13, a matrix converter 38, which is composed of nine switches arranged as a three by three switch matrix (switches SAa to SCc), is used for achieving power conversion between motor generators MG1 and MG2. A voltage-type inverter 36 and a DC chopper circuit 32 are further provided for exchanging electric power with a battery 12. The voltage source inverter 36 is formed of a bridge circuit with each of switching devices Q31 to Q36 paired with their respective corresponding diodes D31 to D36 connected in inverse parallel therewith as each of six arms. The six arms are composed of two U-phase bridge arms 36U, two V-phase bridge arms 36V, and two W-phase bridge arms 36W. The DC chopper circuit 32 is formed of a reactor L and switching devices Q11 and Q12 paired with their respective corresponding diodes D11 and D12. A control apparatus 40 controls the AC motor driving circuit based on control signal from a controller 48.

In FIG. 12, it is however difficult to reduce circuit size because it is necessary to provide a large-capacity capacitor as a capacitor 13 for smoothing DC power. Moreover, because it is necessary to provide a reactor L1 in the DC chopper circuit 12, there is a problem that this respect leads to increase of circuit size.

On the other hand, in FIG. 13, it is also difficult to reduce circuit size because it is necessary to provide a DC capacitor C2 between the battery 12 and the motor generator MG2. Moreover, because it is necessary to provide a reactor L in the DC chopper circuit 32, there is a problem that this respect leads to increase of circuit size.

For example, a technique is disclosed in IEEJ Trans. IA, Vol. 126, No. 9, pp. 1161-1170, "Technical Trends of Direct AC/AC Converters" in which a current-type rectifier circuit and a voltage-type inverter are combined so that an AC power supply and an AC motor are connected to each other without connection of any capacitor to an output stage of the rectifier circuit. The combination of a current rectifier circuit and a voltage-type inverter is also referred to as indirect matrix converter.

This indirect matrix converter can perform AC/AC power conversion in the same manner as the matrix converter. For example, the matrix converter 38 shown in FIG. 13 can be replaced by the indirect matrix converter.

In AC/AC power conversion, use of a matrix converter or an indirect matrix converter permits the capacitor to be dispensed with. When a DC power supply is further provided in the circuit and the voltage of the DC power supply is lower than the inverter input voltage, it is however necessary to provide a chopper circuit designated by 12 in FIG. 12 or by 32 in FIG. 13 between the DC power supply and the voltage-type inverter in order to boost the DC power supply voltage. When such a chopper circuit is provided, it is necessary to provide a large capacitor in an output of the chopper circuit (as an input of the inverter). There is a problem that this leads to increase of circuit size.

SUMMARY OF THE INVENTION

In order to solve the foregoing problem, in a first aspect of the invention an AC motor driving circuit for driving an AC motor includes a first rectifier circuit and a second rectifier circuit, wherein the first rectifier circuit having a filter circuit and first bidirectional switches bridge-connected to an output of the filter circuit as an upper or lower arm is connected to an AC power supply; the AC motor is connected to an output of the rectifier circuit through a voltage-type inverter; the second rectifier circuit having second bidirectional switches; the one terminal of each of second bidirectional switches is connected to a junction between the output of the filter circuit and corresponding one of the first bidirectional switches in the first rectifier circuit; the other terminal of each of the second bidirectional switches is connected to one terminal of a series circuit having a reactor and a DC power supply; and the other terminal of the series circuit is connected to one of output terminals of the first rectifier circuit.

As a second aspect of the invention, the first bidirectional switches of upper or lower arms in the first rectifier circuit can be replaced by unidirectional switches having reverse blocking capabilities.

In the AC motor driving circuit according to a third aspect of the invention, the second bidirectional switches can be replaced by unidirectional switches that have reverse blocking capabilities.

As a fourth aspect of the invention, electric power from the AC motor can be regenerated in the AC power supply through the first rectifier circuit.

In the AC motor driving circuit according to a fifth aspect of the invention, the DC power supply can be charged with electric power regenerated from the AC motor through the second rectifier circuit.

According to the invention, a large-size capacitor provided in a DC link can be dispensed with. As a result, reduction of circuit size can be achieved.

In addition, efficiency in conversion between the AC power supply and the DC power supply can be improved.

DETAILED DESCRIPTION OF THE INVENTION

Figure 1:
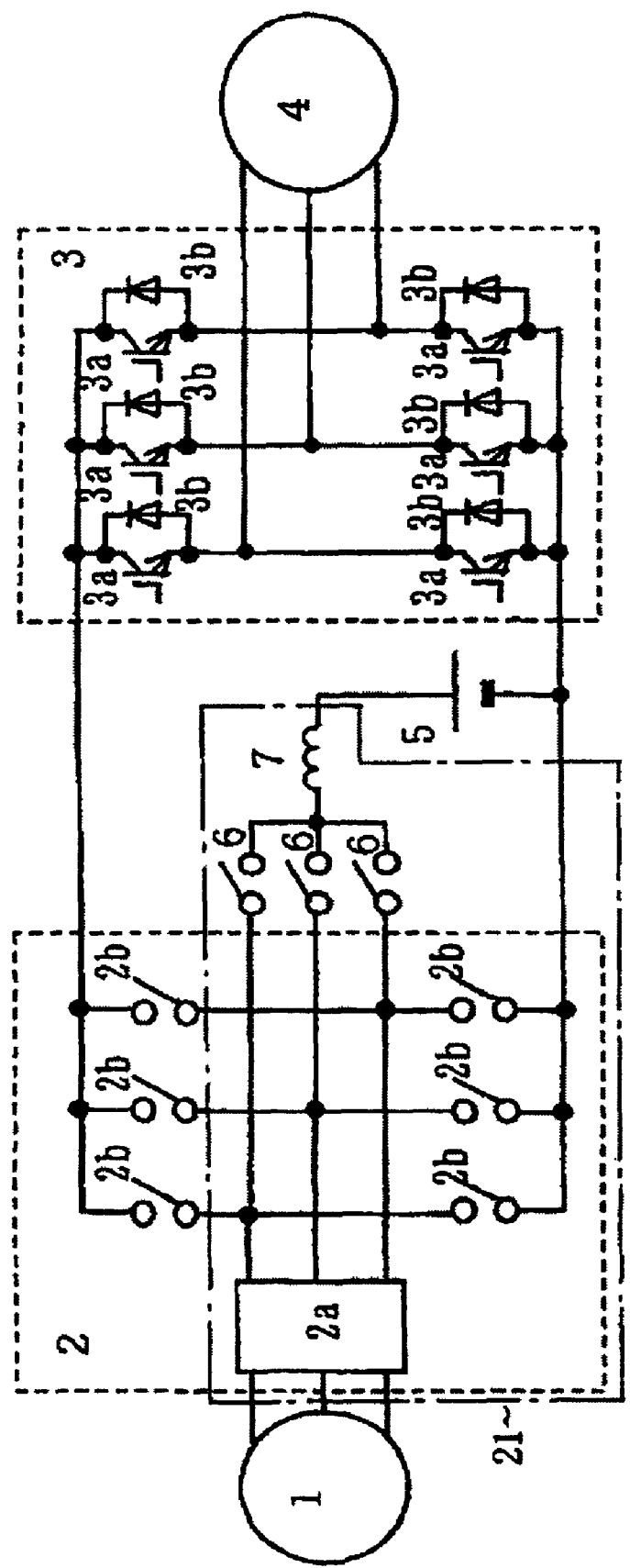
FIG. 1 is a circuit diagram showing an embodiment of the invention.

FIG. 1 is a configuration view showing an embodiment of the invention.

As shown in FIG. 1, a filter circuit 2a is connected to an output of a three-phase AC power supply 1 and bidirectional switches 2b are bridge-connected to an output of the filter circuit 2a in the embodiment. The filter circuit 2a and the bridge-connected bidirectional switches 2b form a first current-type rectifier circuit 2 having six arms. A voltage-type inverter 3 is provided in an output of the rectifier circuit 2. An AC motor 4 is driven by an output of the voltage-type inverter 3. The voltage type inverter 3 is formed of a bridge circuit with each of switching devices 3a paired with their respective corresponding diodes 3b connected in inverse parallel therewith as each of six arms.

One terminal of each of bidirectional switches 6 is connected to a junction between each output terminal of the filter circuit 2a and corresponding one of the bidirectional switches 2b. The other terminals of the bidirectional switches 6 are collectively connected to a reactor 7. The other terminal of the reactor 7 is connected to a plus terminal of a storage battery 5. Further, a minus terminal of the storage battery 5 is connected to a minus output terminal of the rectifier circuit 2. Incidentally, the storage battery 5 may be replaced by a capacitor or a DC power supply connected to a storage battery or a capacitor through a DC/DC converter such as a DC chopper circuit capable of performing bidirectional power conversion.

In the configuration shown in FIG. 1, power conversion between the AC output of the AC power supply 1 and the AC input of the AC motor 4 is achieved in such a manner that the AC power of the AC power supply 1 is converted once into DC power by the current-type rectifier circuit 2 and the converted DC power is then converted into AC power by the voltage-type inverter 3. The three bidirectional switches 6 using the filter circuit 2a in common, the three bidirectional switches 2b of the lower arms of the current-type rectifier circuit 2 and the reactor 7 form a second current-type rectifier circuit 21 having six arms. In this manner, power conversion can be achieved between the AC power supply 1 and the storage battery 5.

The resulting circuit can be operated while an operating mode for feeding electric power to the AC motor 4 from the AC power supply 1 through the rectifier circuit 2 and an operating mode for feeding electric power to the storage battery 5 from the AC power supply 1 are switched in a time division manner. On this occasion, in the operating mode for feeding electric power to the AC motor 4 through the rectifier circuit 2, it is necessary to always turn on any one of the three switches 2b of the lower arms of the rectifier circuit 2. In accordance with this operation, corresponding one of the three second bidirectional switches 6 which is connected to the turned-on switch 2b and the output of the filter circuit 2a in the rectifier circuit 2 is set to be always turned off in the rectifier circuit 21. When the switch 2b turned on in the lower arms of the rectifier circuit 2 is changed, corresponding one of the switches 6 to be turned off may be changed in accordance with the change of the switch 2b. In this manner, effective input power of the rectifier circuit 21 can be set at 0 during this period, so that the rectifier circuits 2 and 21 can be controlled in a time division manner without any interference.

Similarly, in the operating mode for feeding electric power to the storage battery 5 through the rectifier circuit 21, corresponding one of the switches 2b of the upper arms of the rectifier circuit 2, connected to turned-on one of the switches 6 and the output of the filter circuit 2a is always turned off in accordance with the operation of the rectifier circuit 21. In this manner, effective input power of the rectifier circuit 2 can be set at 0 during this period, so that the rectifier circuits 2 and 21 can be controlled without any interference.

Thus, output power of the AC power supply 1 can be fed to both the AC motor 4 and the storage battery 5. In addition, the rectifier circuit 2 can be suspended or operated at effective input power of 0 as described above, or the additional rectifier circuit 21 can be suspended or operated at effective input power of 0. In this case, the electric power from the AC power supply 1 can be fed to either of the AC motor 4 and the storage battery 5.

Further, at the time of braking, electric power from the AC motor 4 can be regenerated only in the AC power supply 1, or part or all of the regenerated power can be fed to the storage battery 5 through the rectifier circuit 21.

Figure 2:
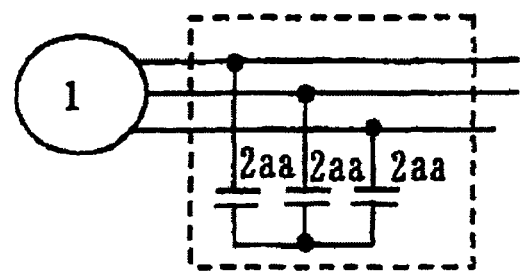
FIG. 2 is a circuit diagram showing a specific example of a filter circuit used in FIG. 1.
Figure 3:
FIG. 3 is a circuit diagram showing a first specific example of a bidirectional switch used in FIG. 1.
Figure 4:
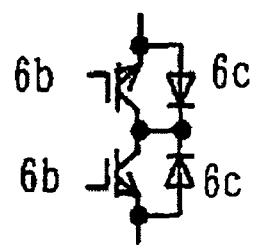
FIG. 4 is a circuit diagram showing a second specific example of the bidirectional switch used in FIG. 1.
Figure 5:
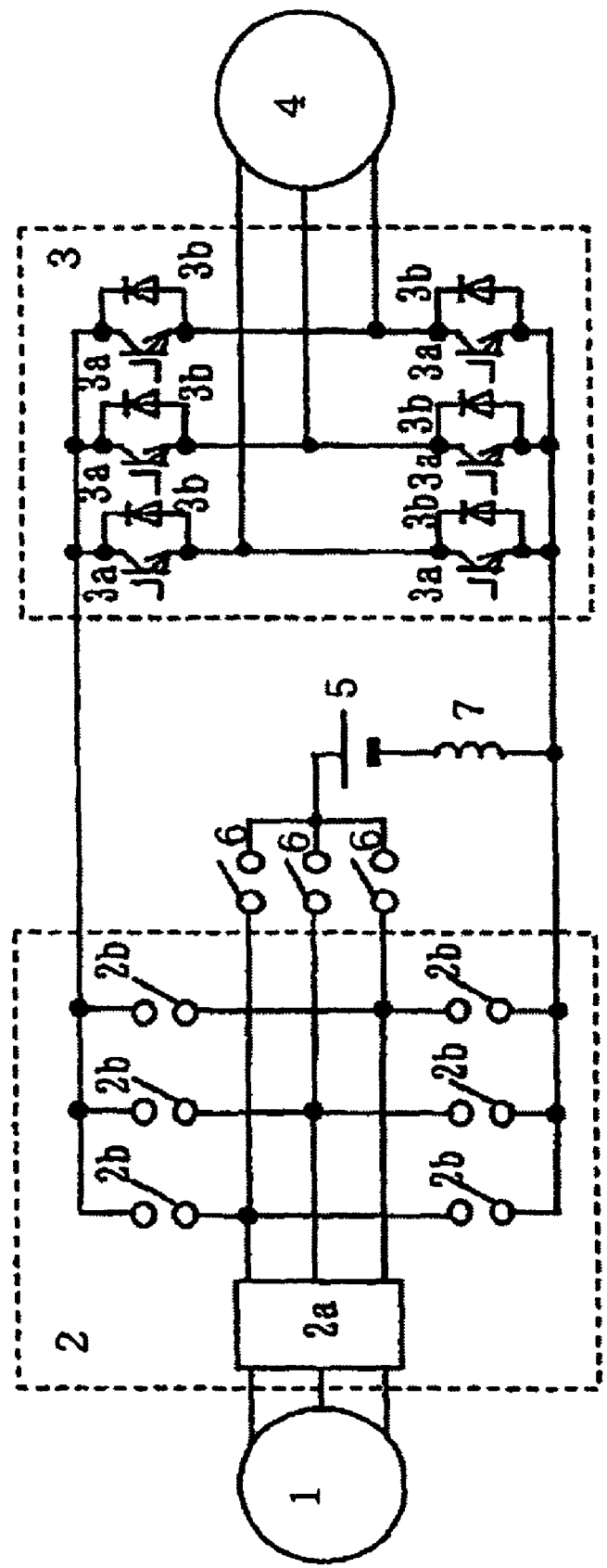
FIG. 5 is a circuit diagram showing a modified example of FIG. 1.

Incidentally, when an inductance not shown but included in the AC power supply is used, the filter circuit 2a can be achieved by an LC filter having star connected capacitors 2aa as shown in FIG. 2. For example, each bidirectional switch 2b or 6 can be achieved when switching elements 6a having reverse blocking capabilities are back-to-back connected to each other as shown in FIG. 3. On the other hand, when switching elements 6b having no reverse blocking capability in themselves are used, diodes 6c may be used in combination with the switching elements 6b as shown in FIG. 4. Further, the order of connection of the reactor 7 and the storage battery 5 in FIG. 1 may be changed as shown in FIG. 5.

Figure 6:
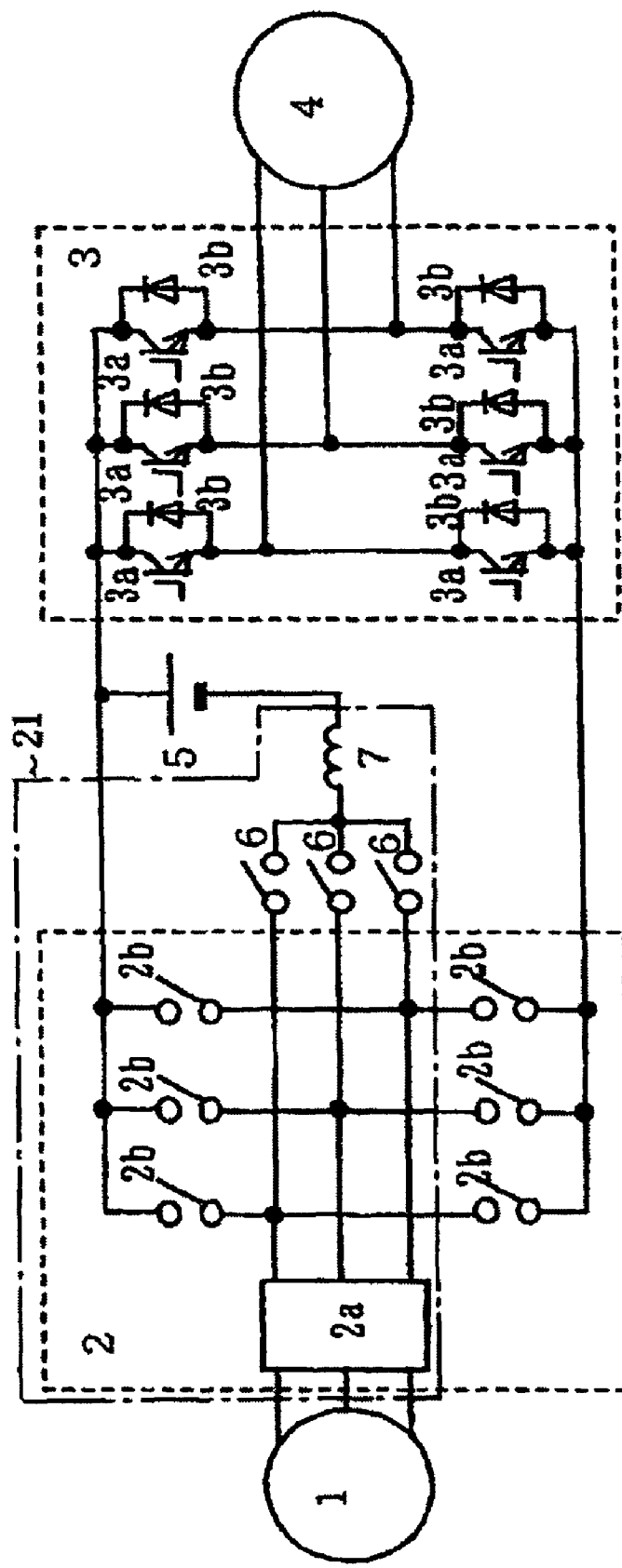
FIG. 6 is a circuit diagram showing another modified example of FIG. 1.

FIG. 6 is a modified example of FIG. 1.

FIG. 6 is different from FIG. 1 in that bidirectional switches 6 are connected to a minus terminal of a storage battery 5 through a reactor 7 while a plus terminal of the storage battery 5 is connected to a plus output terminal of a rectifier circuit 2. In the circuit, a filter circuit 2a, the three bidirectional switches 6, bidirectional switches of three upper arms of the current-type rectifier circuit 2 and the reactor 7 form a current-type rectifier circuit 21 for performing power conversion between an AC power supply 1 and the storage battery 5. In this manner, the same circuit operation as in FIG. 1 can be performed. Incidentally, the order of connection of the reactor 7 and the storage battery 5 may be changed as shown in FIG. 5.

As described above, a filter circuit and bidirectional switches bridge-connected to an output of the filter circuit form a first current-type rectifier circuit. The first current-type rectifier circuit and a voltage-type inverter connected to an output of the first current-type rectifier circuit form an indirect matrix converter. In this manner, power conversion between an AC power supply and an AC motor can be performed without provision of any large capacitor in a DC link.

In addition, one terminal of each of the bidirectional switches is connected to corresponding one of output terminals of the filter circuit of the first current-type rectifier circuit. A series circuit formed from a DC power supply, inclusive of a storage battery or a capacitor, and a reactor is connected to the other terminal of each of the bidirectional switches. Thus, the bidirectional switches, upper or lower arms of the first current-type rectifier circuit, the filter circuit and the reactor can form a second current-type rectifier circuit which uses the AC power supply as an input and uses the DC power supply, inclusive of a storage battery or a capacitor, as an output. As a result, bidirectional power conversion can be performed between the AC power supply and the DC power supplying inclusive of a storage battery or a capacitor. On this occasion, because the bidirectional switches of the upper or lower arms of the first current-type rectifier circuit can serve also as the bidirectional switches of the upper or lower arms of the second current-type rectifier circuit, the total number of bidirectional switches can be reduced by the number of bidirectional switches used in common.

When power conversion from the AC power supply to the AC motor by the first rectifier circuit and the voltage-type inverter and power conversion from the AC power supply to the DC power supply such as a storage battery by the second rectifier circuit are switched in a time division manner, electric power can be fed to the DC power supply such as a storage battery (the DC power supply can be charged) while the AC motor is driven. In addition, when the first current-type rectifier circuit is suspended or operated at effective input power of 0, electric power can be fed only to the DC power supply such as a storage battery. Similarly, when the second rectifier circuit connected to the series circuit formed from the DC power supply such as a storage battery and the reactor is suspended or operated at effective input power of 0, electric power can be fed only to the AC motor.

Further, when the AC motor is subjected to a braking operation, electric power generated in the AC motor can be regenerated in the AC power supply. Similarly, part or all of the regenerated electric power can be fed to the DC power supply such as a storage battery (the DC power supply can be charged) through the additional second rectifier circuit including the bidirectional switches.

Figure 7:
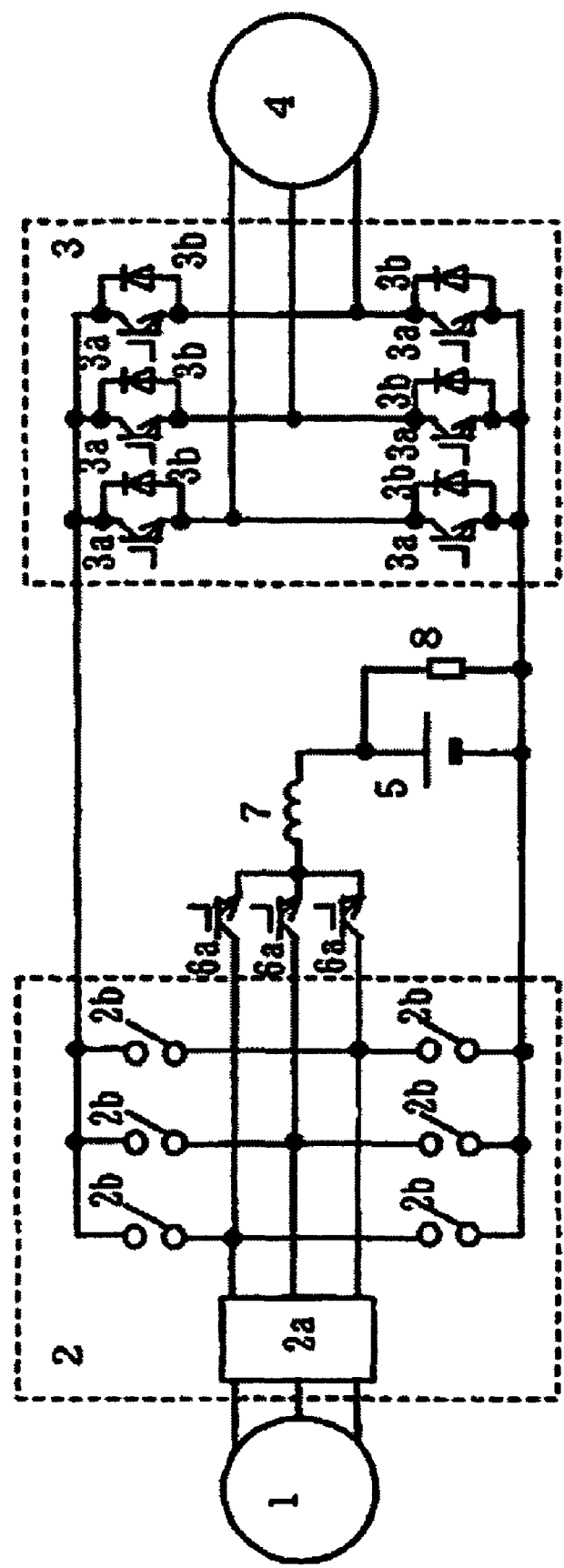
FIG. 7 is a circuit diagram showing a further modified example of FIG. 1.

FIG. 7 shows another modified example of FIG. 1.

This modified example shows the case where this circuit does not need regeneration of electric power to the AC power supply 1 from the storage battery 5 because electric power is fed, for example, to a DC load 8 from the storage battery 5. Therefore, the bidirectional switches 6 in FIG. 1 are replaced by switches 6a having reverse blocking capabilities. Although switching elements having reverse blocking capabilities in themselves are used as the switches 6a, the switches 6a may be replaced by switching elements having no reverse blocking capability and diodes series-connected to the switching elements.

Figure 8:
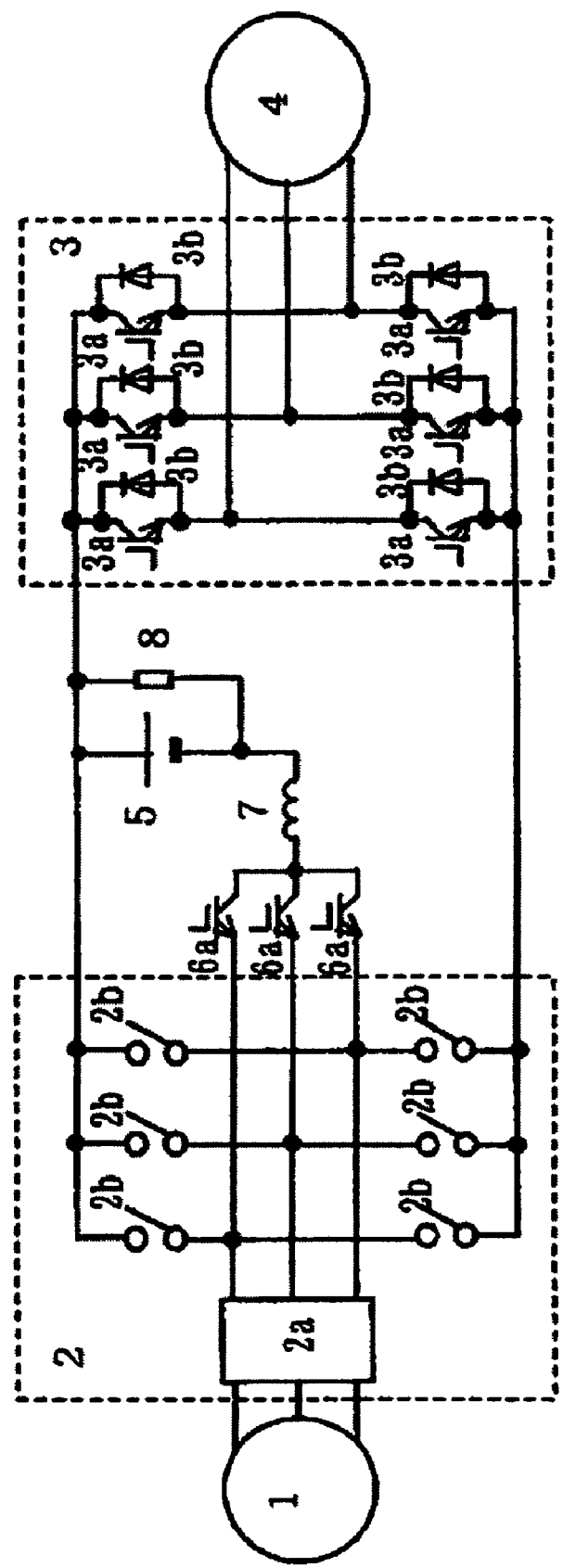
FIG. 8 is a circuit diagram showing a modified example of FIG. 6.

FIG. 8 shows a modified example of FIG. 6. In the modified example, the bidirectional switches 6 in FIG. 6 are replaced by switching elements 6a having reverse blocking capabilities. When, for example, regeneration of electric power to the AC power supply 1 from the storage battery 5 is not required because electric power is fed to the DC load 8 from the storage battery 5, this circuit can perform both power conversion to the AC motor 4 and charging of the storage battery 5.

As described above, for the purpose in which regeneration of electric power from the DC power supply to the AC motor is not required, the circuit can be operated even if the second bidirectional switches connected between an output of the filter circuit of the first rectifier circuit and the series circuit formed from the reactor and the DC power supply are replaced by unidirectional switching elements having reverse blocking capabilities. Thus, the circuit can be simplified compared with the examples shown in FIGS. 1, 5 and 6.

The DC load 8 in FIGS. 7 and 8 can be connected variously as long as the load uses DC power as a power supply. For example, an AC load can be connected through an inverter or a charging circuit for charging another storage battery insulated from the storage battery 5 may be connected by use of an insulation-type DC/DC converting circuit.

Figure 9:
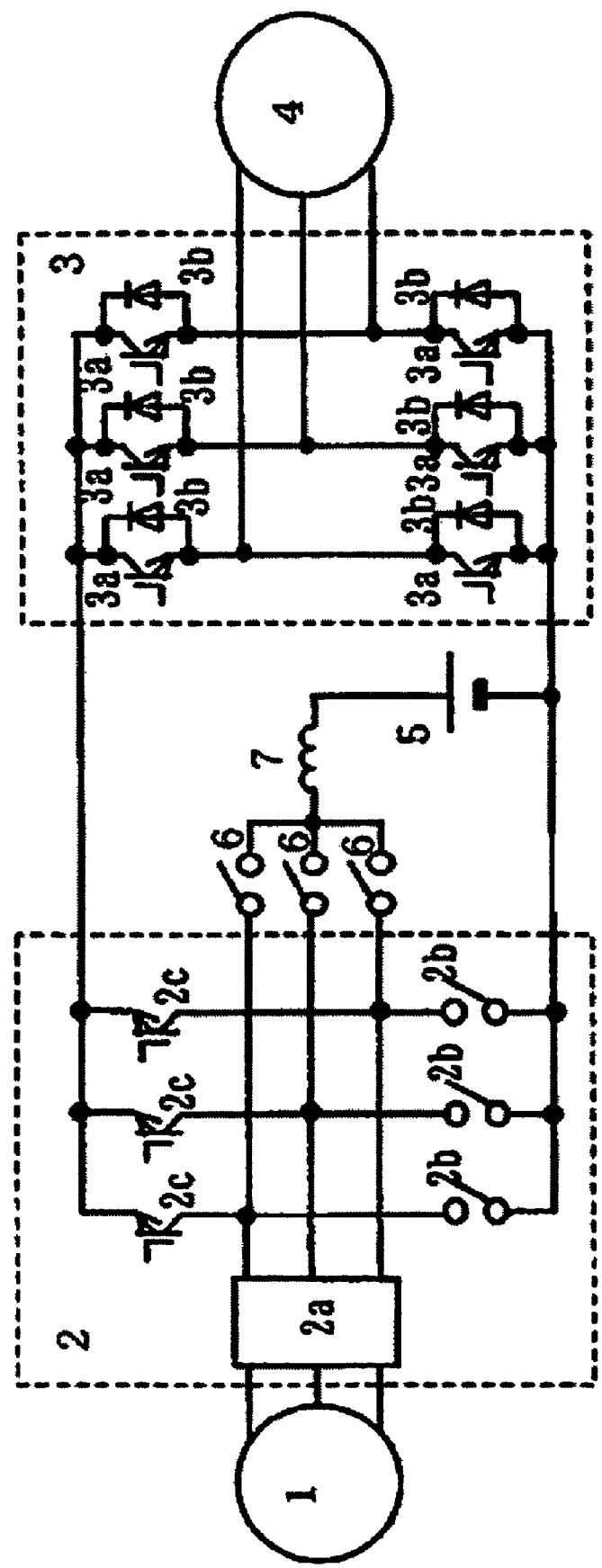
FIG. 9 is a circuit diagram showing a further modified example of FIG. 1.

FIG. 9 shows a further modified example of FIG. 1.

This circuit is configured so that three of the six bidirectional switches 2b which are provided as the upper arms not used for power conversion in the rectifier circuit 2 in FIG. 1 and which are provided between the AC power supply 1 and the storage battery 5 are replaced by three unidirectional switches 2c having reverse blocking capabilities. Although switching elements having reverse blocking capabilities in themselves are used as the switches 2c, the switches 2c may be replaced by switching elements having no reverse blocking capability and diodes series-connected to the switching elements. This circuit cannot perform regeneration of electric power from the AC motor 4 to the AC power supply 1 but this circuit can lead to simplification of the rectifier circuit if regeneration of electric power is not required.

Figure 10:
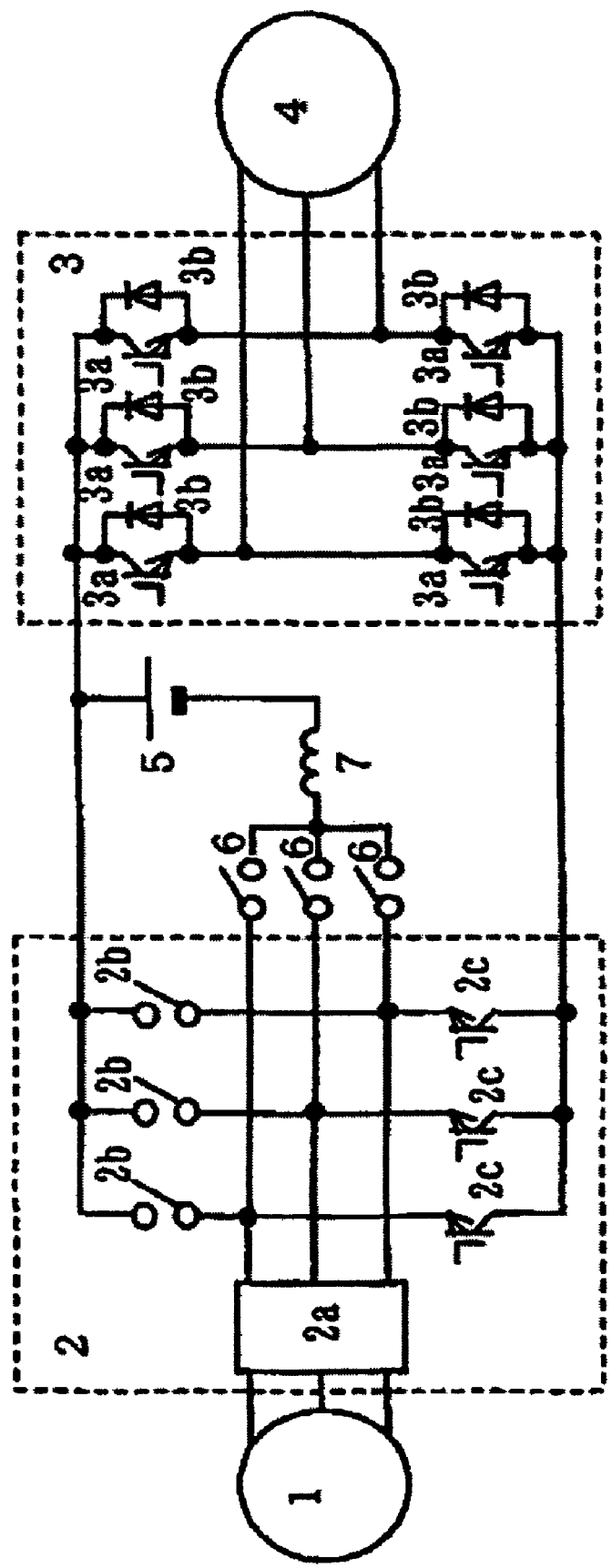
FIG. 10 is a circuit diagram showing another modified example of FIG. 6.

FIG. 10 shows another modified example of FIG. 6. This circuit is configured so that three of the six bidirectional switches 2b which are provided as the lower arms not used for power conversion in the rectifier circuit 2 in FIG. 6 and which are provided between the AC power supply 1 and the storage battery 5 are replaced by three unidirectional switches 2c having reverse blocking capabilities. Operation of this circuit is the same as that in FIG. 9.

In this manner, for the purpose in which regeneration of electric power from the AC motor to the AC power supply is not required, the circuit can be operated even if at least part of the first bidirectional switches bridge-connected in the rectifier circuit are replaced by unidirectional switching elements having reverse blocking capabilities. Thus, the circuit can be simplified compared with the examples shown in FIGS. 1, 5 and 6.

Figure 11:
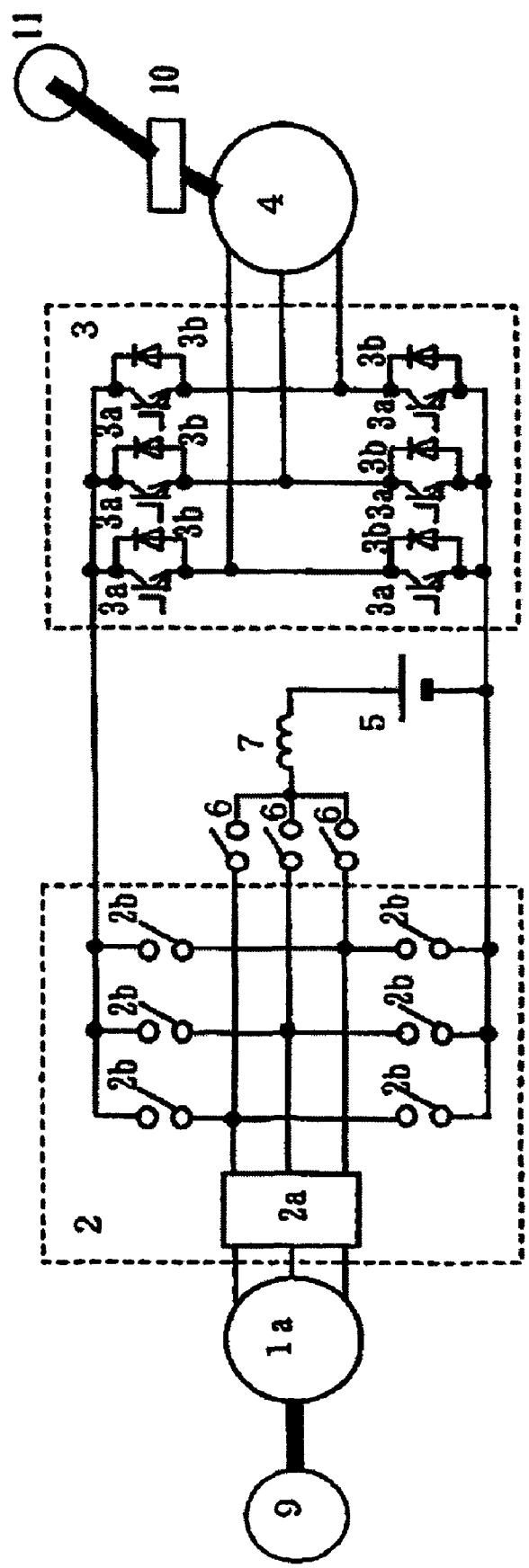
FIG. 11 is a configuration diagram showing an applied example of FIG. 1.
Figure 12:
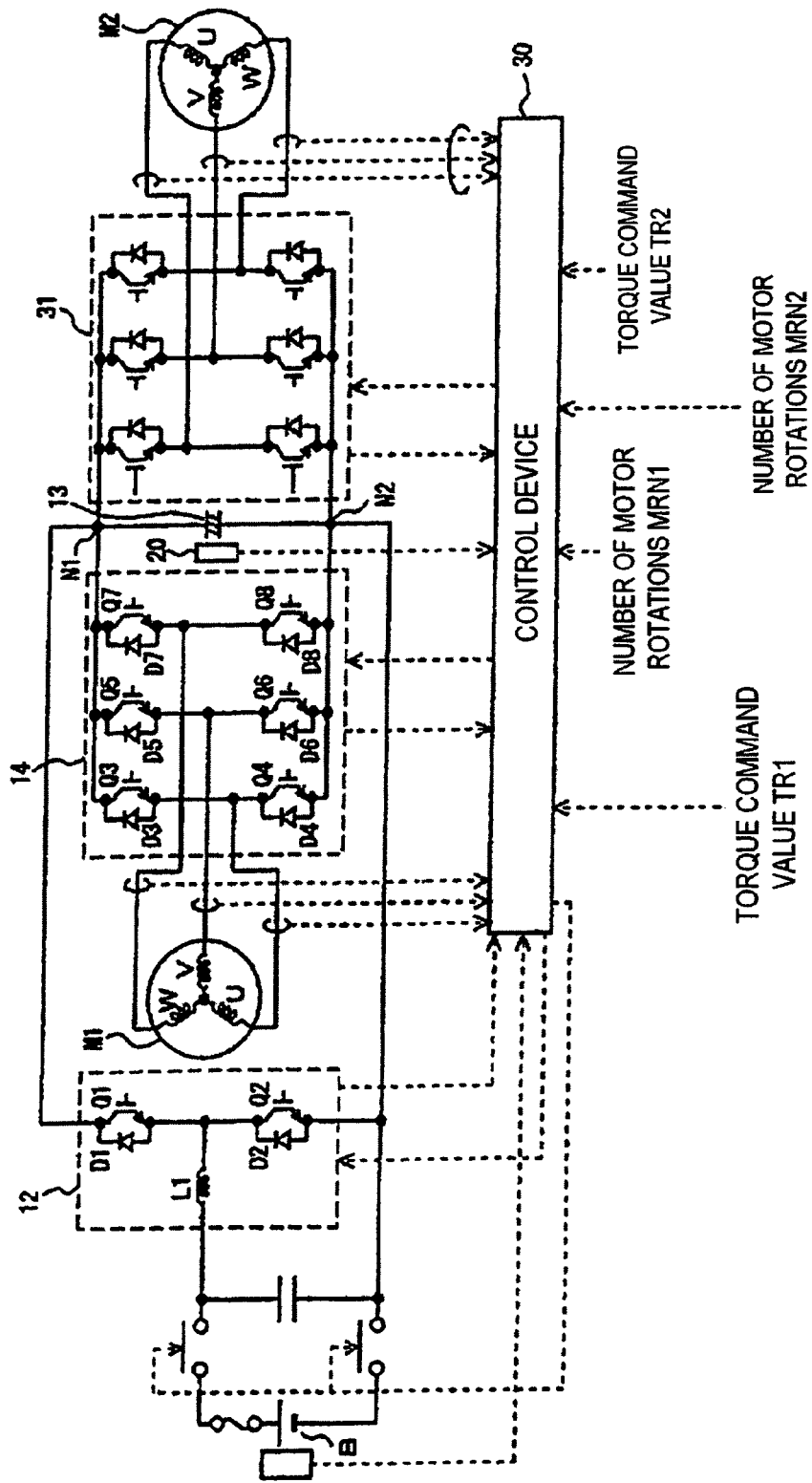
FIG. 12 is a circuit diagram showing a first example of the prior art.
Figure 13:
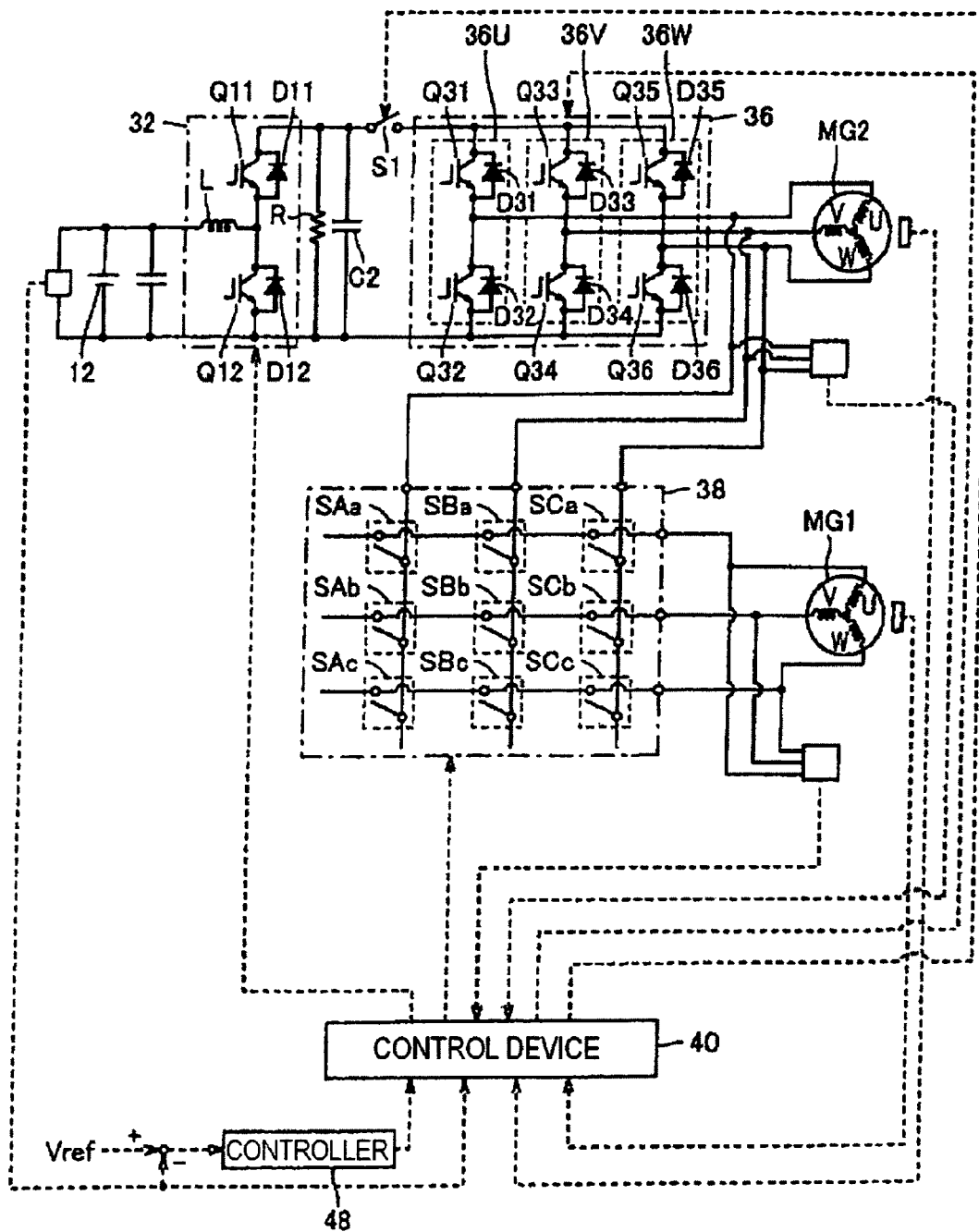
FIG. 13 is a circuit diagram showing a second example of the prior art.

FIG. 11 shows an applied example of FIG. 1. In the applied example, an electric car driving circuit is provided as follows. An internal combustion engine 9 is added to FIG. 1. The internal combustion engine 9 is mechanically connected to an AC power generator 1a. A wheel 11 is mechanically connected to an output shaft of an AC motor 4 through a gear 10. Incidentally, it is a matter of course that the internal combustion engine 9 can be also applied to the circuits shown in FIGS. 5 to 10.

When the circuit shown in FIG. 7 or 8 is applied, a circuit formed as a combination of an inverter and a compressor AC motor in an air-conditioner circuit or a charging circuit for charging a low-voltage auxiliary battery (DC12V) insulated from the storage battery 5 can be connected as the DC load 8.

As described above, in an electric car driving circuit for a hybrid car or the like, it is necessary to mount the circuit in a limited space. Therefore, when the circuit according to the invention is used, a large capacity can be dispensed with. Accordingly, a circuit feeding a larger output can be mounted, so that accelerating/decelerating performance of an electric car can be improved.

It will of course be appreciated by those skilled in the art that the invention may be practiced otherwise than as described herein without departing from the scope of the invention.

What is claimed is:

1. An AC motor driving circuit for driving a first AC motor from an AC power supply and a DC power supply, which is configured to feed and absorb electric power, through a voltage-type inverter, the AC motor driving circuit comprising:
    a first rectifier circuit configured to perform power conversion between the AC power supply and the first AC motor, the first rectifier circuit comprising a filter circuit, and first switches, the filter circuit being connected to the AC power supply at an input of the first rectifier circuit, a first terminal of each of the first switches being bridge-connected to an output of the filter circuit in an upper or lower arm of the first rectifier circuit, a second terminal of each of the first switches being connected to an output terminal of the respective upper or lower arm of the first rectifier circuit, the respective output terminal being connected to the first AC motor through the voltage-type inverter; and
    a second rectifier circuit configured to perform power conversion between the AC power supply and the DC power supply, the second rectifier circuit comprising the filter circuit in common with the first rectifier circuit, second switches and a series circuit, the series circuit including a reactor and the DC power supply, a first terminal of each of the second switches being connected to a junction between the output of the filter circuit and a corresponding one of the first switches in the first rectifier circuit, and a second terminal of each of the second switches being connected to a first terminal of the series circuit including the reactor and the DC power supply, and a second terminal of the series circuit being connected to one of the output terminals of the first rectifier circuit,
    wherein each switch of the first switches and the second switches is a bidirectional switch or a unidirectional switch, and
    the series circuit is configured such that the AC motor driving circuit performs both power conversion to the AC motor and charging of the DC power supply.

2. The AC motor driving circuit according to claim 1, wherein the first switches are bidirectional switches.

3. The AC motor driving circuit according to claim 1, wherein the second switches are bidirectional switches.

4. The AC motor driving circuit according to claim 1, wherein the first switches are unidirectional switches having reverse blocking capabilities.

5. The AC motor driving circuit according to claim 1, wherein the second switches are unidirectional switches having reverse blocking capabilities.

6. The AC motor driving circuit according to claim 1, wherein electric power from the first AC motor is regenerated in the AC power supply through the first rectifier circuit.

7. The AC motor driving circuit according to claim 1, wherein the DC power supply is charged with electric power regenerated from the first AC motor through the second rectifier circuit.

8. An electric car driving circuit comprising the AC motor driving circuit according to claim 1, wherein the AC power supply is a second AC motor driven by an internal combustion engine.

9. An AC motor driving circuit for driving a first AC motor, comprising:
    an AC power supply;
    a DC power supply configured to feed and absorb electric power;
    a voltage-type inverter configured to convert DC power to AC power;
    a first rectifier circuit configured to perform power conversion between the AC power supply and the first AC motor, the first rectifier circuit comprising a filter circuit and first switches, the filter circuit being connected to the AC power supply at an input of the first rectifier circuit, a first terminal of each of the first switches being bridge-connected to an output of the filter circuit in an upper or lower arm of the first rectifier circuit, and a second terminal of each of the first switches being connected to an output terminal of the respective upper or lower arm of the first rectifier circuit, the respective output terminal being connected to the first AC motor through the voltage-type inverter; and
    a second rectifier circuit configured to perform power conversion between the AC power supply and the DC power supply, the second rectifier circuit comprising the filter circuit in common with the first rectifier circuit, second switches and a series circuit, the series circuit including a reactor and the DC power supply, a first terminal of each of the second switches being connected to a junction between the output of the filter circuit and a corresponding one of the first switches in the first rectifier circuit, a second terminal of each of the second switches being connected to a first terminal of the series circuit including the reactor and the DC power supply, and a second terminal of the series circuit being connected to one of the output terminals of the first rectifier circuit,
    wherein each switch of the first switches and the second switches is a bidirectional switch or a unidirectional switch, and
    the series circuit is configured such that the AC motor driving circuit performs both power conversion to the first AC motor and charging of the DC power supply.

10. The AC motor driving circuit according to claim 9, wherein the first switches are bidirectional switches.

11. The AC motor driving circuit according to claim 9, wherein the second switches are bidirectional switches.

12. The AC motor driving circuit according to claim 9, wherein the first switches are unidirectional switches having reverse blocking capabilities.

13. The AC motor driving circuit according to claim 9, wherein the second switches are unidirectional switches having reverse blocking capabilities.

14. The AC motor driving circuit according to claim 9, wherein electric power from the first AC motor is regenerated in the AC power supply through the first rectifier circuit.

15. The AC motor driving circuit according to claim 9, wherein the DC power supply is charged with electric power regenerated from the first AC motor through the second rectifier circuit.

16. An electric car driving circuit comprising the AC motor driving circuit according to claim 9, wherein the AC power supply is a second AC motor driven by an internal combustion engine.

\* \* \* \* \*